US006644436B2

(12) United States Patent
Hofmann et al.

(10) Patent No.: US 6,644,436 B2
(45) Date of Patent: Nov. 11, 2003

(54) DEVICE FOR NOISE CONFIGURATION IN A MOTOR VEHICLE

(75) Inventors: Marcus Hofmann, Stuttgart (DE); Roudolf Starobinski, Hamburg (DE); Hans Striebel, Stuttgart (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/102,209

(22) Filed: Mar. 21, 2002

(65) Prior Publication Data

US 2002/0157897 A1 Oct. 31, 2002

(30) Foreign Application Priority Data

Mar. 21, 2001 (DE) ........................................ 101 13 638

(51) Int. Cl.[7] .......................... B64D 33/02; F01N 7/02; F01N 7/10

(52) U.S. Cl. ...................... 181/214; 181/232; 181/264; 181/240

(58) Field of Search ................................ 181/279, 280, 181/232, 264, 212–214, 240, 227–229, 247, 272, 277, 163, 156, 155, 196, 197, 204, 241, 249, 181–183, 185, 187, 189, 237, 238

(56) References Cited

U.S. PATENT DOCUMENTS

| | | | | | |
|---|---|---|---|---|---|
| 1,715,598 | A | * | 6/1929 | Hawley et al. | 181/168 |
| 1,845,210 | A | * | 2/1932 | Abrahams | 181/168 |
| 3,181,648 | A | * | 5/1965 | Bottum | 181/63 |
| 3,897,852 | A | * | 8/1975 | Hoffman et al. | 181/45 |
| 4,192,404 | A | * | 3/1980 | Nakagawa et al. | 181/255 |
| 4,299,121 | A | * | 11/1981 | Asayama et al. | 73/118.1 |
| 4,301,332 | A | * | 11/1981 | Dusanek | 179/1 E |
| 5,372,109 | A | * | 12/1994 | Thompson et al. | 123/323 |
| 5,444,197 | A | * | 8/1995 | Flugger | 181/264 |
| 5,619,020 | A | * | 4/1997 | Jones et al. | 181/206 |
| 5,655,367 | A | * | 8/1997 | Peube et al. | 60/324 |
| 6,367,580 | B1 | * | 4/2002 | Chang | 181/241 |
| 6,457,548 | B1 | * | 10/2002 | D'Hoogh | 181/171 |
| 6,551,389 | B2 | * | 4/2003 | Spannbauer et al. | 96/380 |
| 2003/0057015 | A1 | * | 3/2003 | Helber et al. | 181/240 |

FOREIGN PATENT DOCUMENTS

| | | | | | |
|---|---|---|---|---|---|
| DE | 42 33 252 | | | 12/1993 | |
| DE | 44 35 296 | | | 4/1996 | |
| DE | 197 04 376 | | | 8/1998 | |
| DE | 10042012 | A1 | * | 5/2001 | B60Q/9/00 |
| DE | 10116169 | A1 | * | 10/2002 | B60Q/5/00 |
| DE | 10149169 | C1 | * | 12/2002 | G10K/9/02 |
| GB | 2354986 | A | * | 4/2001 | B60Q/5/00 |
| JP | 57083998 | A | * | 5/1982 | H04R/17/00 |
| JP | 02248610 | A | * | 10/1990 | F01N/7/00 |

* cited by examiner

*Primary Examiner*—Robert E. Nappi
*Assistant Examiner*—Pat Miller
(74) *Attorney, Agent, or Firm*—Crowell & Moring LLP

(57) ABSTRACT

A device for noise configuration in a motor vehicle has a hollow body which is divided into at least two spaces. One space is connected to a gas-carrying part of an internal combustion engine arranged in the motor vehicle, and the other space is coupled acoustically to an interior and/or to an engine space of the motor vehicle and/or to the space surrounding the motor vehicle. The hollow body is divided into the two spaces by an essentially acoustically inactive wall. A vibrational element, which extends into both spaces, is arranged within the hollow body.

59 Claims, 7 Drawing Sheets

DEVICE FOR NOISE CONFIGURATION IN A MOTOR VEHICLE

BACKGROUND AND SUMMARY OF THE INVENTION

This application claims the priority of German Application No. 101 13 638.2, filed Mar. 21, 2001, the disclosure of which is expressly incorporated by reference herein.

The invention relates to a device for noise configuration in a motor vehicle.

Thanks to advances in acoustic technologies, motor vehicles of recent design, in particular vehicles of the sophisticated and sportscar class, are distinguished by high noise comfort in the passenger space of the vehicle. The high noise comfort is in this case characterized by a low sound-pressure level and by largely suppressed disturbing noises. This also applies to the external noise of the motor vehicle, in particular with regard to statutory regulations, according to which, for example in the Federal Republic of Germany, a maximum sound-pressure level of 74 dB(A) is prescribed.

The increasing emotional factor in the use of or decision to buy the above-mentioned vehicles results in the growing importance of a configuration of the internal and external noise of the motor vehicle which is aimed specifically at the particular type of vehicle.

Since vehicles of the luxury and sportscar class have a low sound-pressure level in the interior, it is often relatively difficult for the driver, solely by means of the engine noise prevailing in the interior of the vehicle, to detect the instantaneous load state of the internal combustion engine arranged in the vehicle. However, this is frequently desirable, precisely in the sportscar sector, because it is precisely here where there are vehicles in which the driver's subjective impressions play a part in the use or purchase of such a vehicle.

In order nevertheless to afford the driver the possibility of detecting the load state of the engine during travel by means of the engine noise, measures are taken on the sound insulation system, and this may mean an increase in the external noise level. This often results in appreciable pollution of the adjacent surroundings or of the environment. Furthermore, because of statutory provisions, the external noise level can be increased only to a very restricted extent.

The problems described above have already been recognized, and it is known from German Patent Document DE 197 04 376 A1 to connect the filter housing of an air-filter arrangement for an internal combustion engine of a motor vehicle acoustically to the passenger space of the motor vehicle via a line.

DE 42 33 252 C1 describes a motor vehicle in which a main line of an intake or exhaust system is connected to the passenger space via a line. A diaphragm is arranged in the region of issue of the line into the passenger space, and a throttle valve adjustable in dependence on an accelerator pedal is arranged between the diaphragm and the main line.

DE 44 35 296 A1 describes a motor vehicle with an internal combustion engine, in which the arrangement known from DE 42 33 252 C1 is to be improved. For this purpose, a line pipe, which is provided with at least one acoustic resonator, adjoins the diaphragm on the side facing away from the pipe piece.

Particularly with regard to supercharged internal combustion engines, that is to say in internal combustion engines with turbochargers or compressors, however, there is a problem that, in particular, in the line leading from the intake line to the diaphragm, such high pressures prevail that the diaphragm is exposed to a very high static preload which not only impairs the functioning of the diaphragm for the transmission of sound waves, since the diaphragm experiences excessive deflection, but may also lead to a load on the diaphragm such that damage to the latter during operation cannot be ruled out. A further disadvantage of the known prior art is that the sound pattern transmitted, for example, to the interior can be influenced only slightly.

An object of the present invention, therefore, is to provide a device for noise configuration in a motor vehicle, which, in particular, is also suitable, without any difficulty, for supercharged internal combustion engines. However, such a device is preferably also to be suitable for non-supercharged internal combustion engines and, furthermore, is to make it possible to influence simply, and in as wide-ranging a way as possible, the sound pattern which emanates from the internal combustion engine and is to be appropriately transmitted.

This object is achieved, according to the invention, by providing a device for noise configuration in a motor vehicle, with at least one hollow body which is divided into at least two spaces, one space being connected to a gas-carrying part of an internal combustion engine arranged in the motor vehicle, and the other space being coupled acoustically to at least one of an interior of the motor vehicle, an engine space of the motor vehicle, and a space surrounding the motor vehicle, wherein the hollow body is divided into two spaces by an essentially acoustically inactive wall, and wherein a vibrational element which extends into both spaces is arranged within the hollow body.

According to the invention, the hollow body is divided into the two spaces by an essentially acoustically inactive wall. By means of this wall, which therefore transmits essentially no sound waves from the space connected to the gas-carrying part into the space which is coupled acoustically to the interior and/or to the engine space and/or to the space surrounding the motor vehicle, a separation of the two spaces of the hollow body from one another is provided, which can be exposed without difficulty to pressure load even in the case of supercharged internal combustion engines. It is now possible, even in the case of supercharged internal combustion engines, to connect the hollow body directly upstream of the throttle valve, with the result that the sound character which is often unfavorable because of flow noises and low sound-pressure levels when the hollow bodies are connected to the air filter can be avoided.

The wall according to the invention may be designed to be so rigid that it can easily cope with the pressure loads which occur. The appropriate selection of the wall depends on the respective application.

The vibrational element which, according to the invention, extends into both spaces is provided for transmitting the sound waves from the space connected to the gas-carrying part into the space coupled acoustically to the interior. Thus, the noises occurring in the region of the internal combustion engine are therefore transmitted to the interior and/or the engine space and/or to the space surrounding the motor vehicle, so that the driver can detect acoustically the load-dependent impression of noise of the internal combustion engine.

By the sound-wave transmission being uncoupled according to the invention from the separation of the two spaces, a multiplicity of possibilities for designing the vibrational element are afforded, thus entailing the advantage that the device according to the invention can be used for the most diverse internal combustion engines, the most diverse motor vehicles and the most diverse areas of application. The sound issuing from the hollow body may advantageously be guided into the interior, the engine space or else outwards.

Advantageously, it is not necessary to increase the external sound level, with the result that the exhaust system can be sound-insulated as effectively as possible, thus leading to a considerable relief of the environment and of the adjacent surroundings of the motor vehicle. The setting of the interior noise is uncoupled from the external noise.

It is possible, moreover, to insulate the interior of the motor vehicle from disturbing external noises, such as wind noises or rolling noises of the vehicle wheels, since these noises, usually felt to be unpleasant by the driver, but hitherto necessary for the driver's acoustic orientation, can now be as far as possible kept away from the interior, since, with the aid of the device according to the invention, the information on the load state of the internal combustion engine can be absorbed by the driver in a way which is felt to be as pleasant as possible.

In an advantageous development of the invention, the vibrational element can divide the two spaces in each case into subspaces, at least the subspaces of the space connected to the gas-carrying part being connected to one another in order to allow pressure compensation.

When the vibrational element thus ensures a further subdivision of the two spaces, this allows even better transmission or higher amplification of the sound waves emanating from the internal combustion engine, so that the effectiveness of the device according to the invention is increased. In this respect, the necessary pressure compensation is afforded by a connection of at least the subspaces of the space connected to the gas-carrying part.

In further embodiments, this connection may be formed, for example, by a bore or by a duct.

When, in another advantageous design of the invention, in which another hollow space is arranged in the line leading to the interior and/or to the engine space of the motor vehicle and/or to the space surrounding the motor vehicle, wherein at the entrance an absorption material is arranged in the hollow body so, through the appropriate design of the hollow body and the absorption material, a reduction of the high-frequency portions and simultaneously an amplification of the low-frequency portions of the transmitted sounds is possible.

This design could also be used if the vibrational element were only designed as a membrane and if no acoustically inactive wall were provided.

Further advantageous refinements and developments of the invention may be gathered from the exemplary embodiments illustrated in principle below by means of the drawings:

DETAILED DESCRIPTION OF THE DRAWINGS

Figure 1:
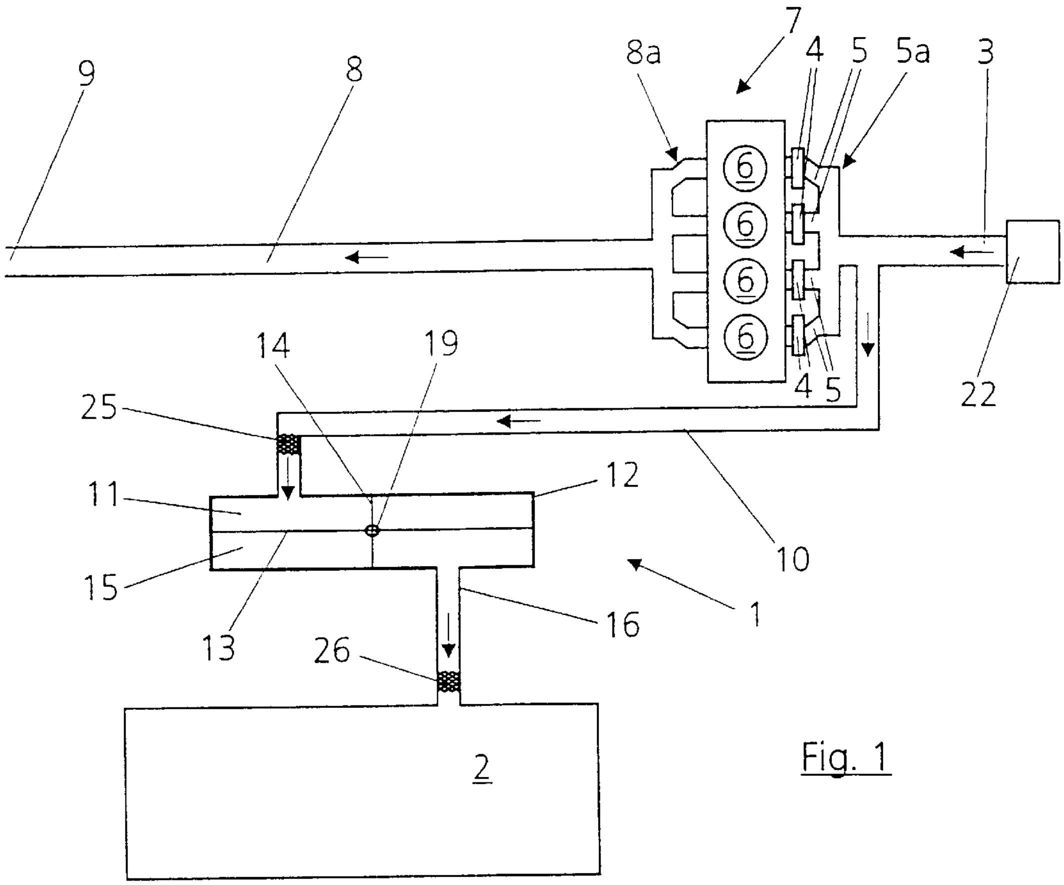
FIG. 1 is a schematic view which shows a device for noise configuration in a motor vehicle, constructed according to the preferred embodiments of the invention connected to an intake pipe of the motor vehicle.

FIG. 1 shows a diagrammatic illustration of a device 1 for noise configuration in a motor vehicle which is not illustrated in its entirety. The device 1 may in this case influence the noise both in an interior 2 and/or an engine space, not illustrated, of the motor vehicle and in the surroundings of the motor vehicle, that is to say the internal noise and/or the external noise of the motor vehicle.

Air flowing into an intake pipe 3 is mixed with fuel in a known way by means of injection devices 4. The injection devices 4 are at the same time located, in a likewise known way, in each case in intake ducts 5 which are arranged downstream of the intake pipe 3 in the direction of flow (see arrows) of the air and which, in the present instance, are considered as integral parts of the intake pipe 3. The intake ducts 5 together form an intake manifold *5a*, terminating in individual cylinders 6 of an internal combustion engine 7 arranged in the motor vehicle and supply the fuel/air mixture to the same cylinders. The internal combustion engine 7 may, of course, also be designed as a direct-injection internal combustion engine 7.

The exhaust gas occurring as a result of the combustion of the fuel/air mixture is discharged into the surroundings via an exhaust system 8 and an outlet orifice 9. The exhaust system 8 is connected to the internal combustion engine 7 in a way known per se by means of an exhaust manifold *8a*.

A tubular line part 10, which is preferably designed as a hose line, branches off from the intake pipe 3 upstream of the intake manifold *5a*. The tubular line part 10 issues in a space

11 of a voluminous hollow body 12 which, in the present exemplary embodiment, has at least approximately a cylindrical shape. Virtually any other volume shape is, of course, also possible for the hollow body 12, since the shape of the latter plays only a very minor part in its function.

Furthermore, for all the embodiments of the device 1 which are described below, it is also possible to combine a plurality of hollow bodies 12 with one another both in series and in parallel.

Figure 3:
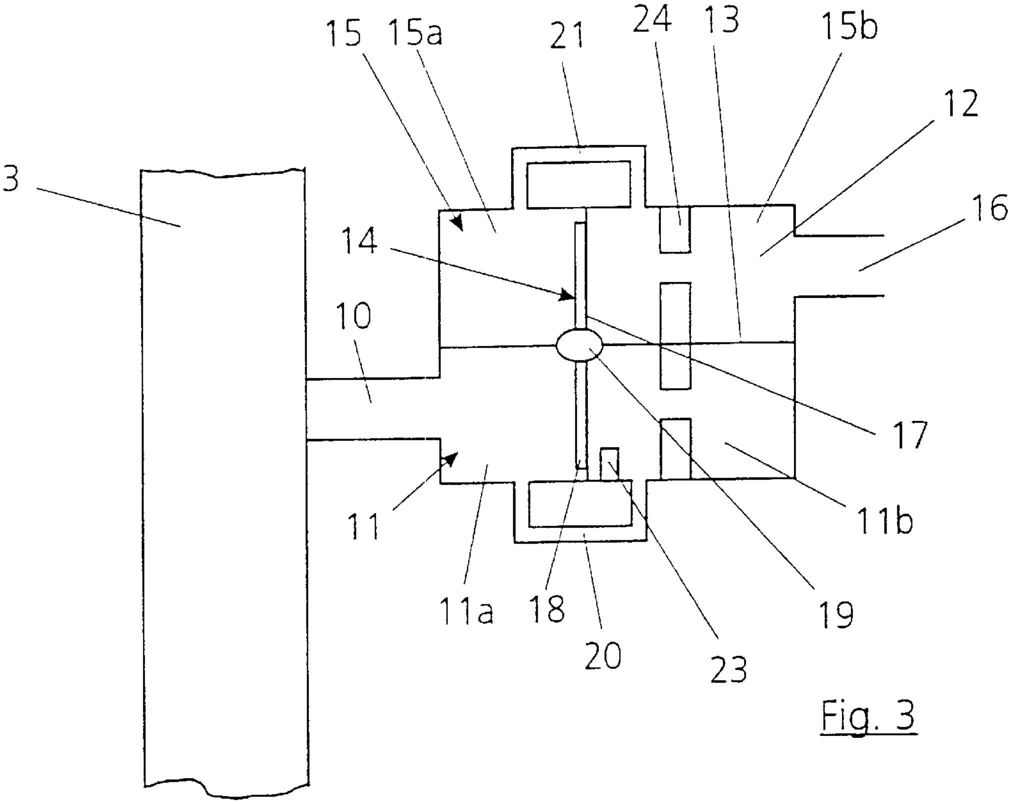
FIG. 3 is a schematic view which shows a first embodiment of a device according to the invention for use with the arrangements of FIG. 1 and FIG. 2.

As can be gathered from the first exemplary embodiment according to FIG. 3, an acoustically inactive wall 13 and a vibrational element 14 are located within the hollow body 12. The wall 13, which is designed rigidly in this embodiment, divides the hollow body 12 into the entry-side space 11, already mentioned, and a further exit-side space 15. The sound waves generated in the intake pipe 3 therefore essentially cannot be transmitted from the wall 13 to the space 15. The expression "essentially" means, in this connection, that the transmission of sound waves through the wall 13 is negligible, as compared with the below-described transmission of sound waves through the vibrational element 14 which constitutes an important feature of the device 1.

The vibrational element 14 extends into both spaces 11 and 15 and thus serves for transmitting the sound waves present in the space 11 or passing into the latter into the space 15 and from there into the interior 2 or any other space to which may lead a line 16 which emanates from the space 15 and, like the line 10, is likewise designed preferably as a hose line. In other words, the vibrational element 14 connects the spaces 11 and 15 acoustically to one another.

In the embodiment of FIG. 3, the vibrational element 14 has a thin elastic diaphragm 17 connected to the hollow body 12 and a plate 18 which is attached to the elastic diaphragm and which may be designed, for example, in the sandwich form of construction and be provided with a coating. Instead of a sandwich form of construction, any other suitable lightweight form of construction is also possible for the plate 18. What is critical is a low mass of the plate 18, at the same time with high rigidity.

The vibrational element 14 is mounted rotatably about a center of rotation 19 which, in the present case, is formed by the point of intersection of the vibrational element 14 with the wall 13. As a result of the vibration of the element 14 about the center of rotation 19, therefore, the sound present in the line part 10 is transferred into the line 16. The diaphragm 17 amplifies these sound waves, on the one hand, by virtue of its elasticity and, on the other hand, due to the fact that, by virtue of the presence of the diaphragm 17, a higher pressure in the space 11 can be built up, which leads to a greater deflection of the vibrational element 14. The plate 18 is constructed as rigidly as possible, so that it executes only the vibrations about its center of rotation 19 caused by the sound pressure and as low characteristic vibrations of the plate 18 as possible occur. At the same time, the plate 18 should be as light as possible, so that it does not require any high forces for its acceleration. Moreover, it is possible to design the plate 18 in such a way that its characteristic modes can be utilized specifically during vibration, for example by means of a softer or harder design of the plate 18.

The vibrational element 14 divides the two spaces 11 and 15 in each case into subspaces 11*a*, 11*b* and 15*a*, 15*b*. To compensate the pressure difference between the subspaces 11*a* and 11*b*, these are connected to one another, which is implemented, in the present case, by a duct 20 which is mounted on the outside of the hollow body 12 and connects the subspaces 11*a* and 11*b* to one another and which may be formed, for example, by a hose. The subspaces 15*a* and 15*b* are also connected by means of a duct 21 which connects these to one another, pressure compensation being less important than in the space 11 on account of the much smaller pressure difference in the subspaces 15*a* and 15*b*. To be precise, in the space 11, there is the problem that a relatively high static pressure prevails in the space 11 due to a compressor 22 which, according to FIG. 1, is arranged in the intake pipe 3. Instead of the compressor 22, a blower may also be provided. Without the connection of the subspaces 11*a* and 11*b*, this pressure would, of course, prevail only in the subspace 11*a*, which would lead to a high load on the vibrational element 14, in particular on the diaphragm 17 of the latter. In addition, the subspace 15*a* could be connected to the surroundings via a bore.

Instead of the ducts 20 and 21, a bore, not illustrated, could also be provided in the plate 18 and/or the diaphragm 17 for pressure compensation. The size of the bore would, of course, influence the deflection of the plate 18 under dynamic load. Furthermore, the ducts 20 and 21 could also be designed in such a way that they open only in the case of specific static pressure differences and are otherwise closed, which may be implemented, for example, by a ball or a similar shutoff element within the ducts 20 and 21 which then act as a valve and, if designed correspondingly, as low-pass filters.

Alternatively to the embodiment as a combination of the diaphragm 17 and the plate 18, the vibrational element 14 may also be formed merely by the plate 18 which could then be mounted likewise rotatably at the center of rotation 19. The hollow body 12 or the insides of its walls could then be designed in such a way that a connection of the subspaces 11*a* and 11*b* and, if appropriate, also of the subspaces 15*a* and 15*b* would occur if a specific angle of rotation were exceeded by the vibrational element 14. Such an embodiment is illustrated diagrammatically in FIG. 4, the reference symbol 18' is showing the plate in its deflected state in which the subspaces 11*a* and 11*b* are connected to one another.

In order to prevent an excessive deflection of the vibrational element 14, a stop 23 is provided, which, in the present case, is attached to the inside of the wall of the hollow body 12 and may be designed, for example, as a perforated plate. Furthermore, within the space 15, elements 24 are arranged, which vary the passage of the sound waves and therefore the noise occurring in the interior 2 or the other space to which the line 16 leads.

Figure 2:
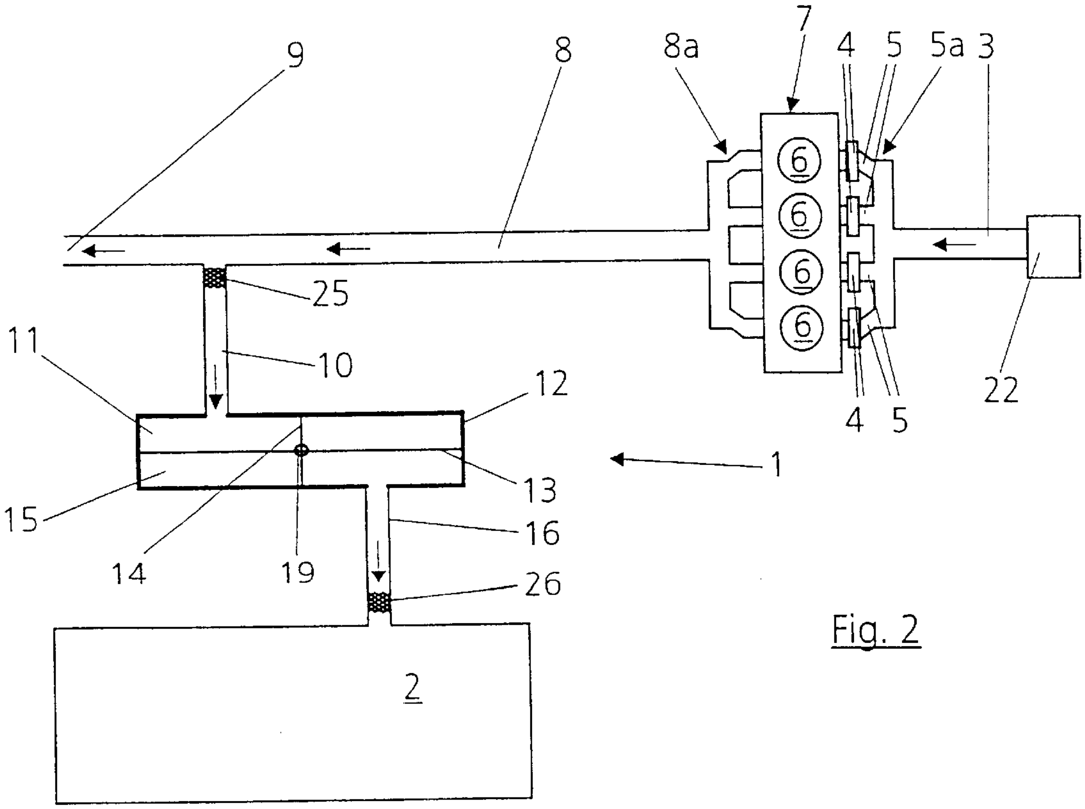
FIG. 2 is a schematic view which shows a device for noise configuration in a motor vehicle, constructed according to the preferred embodiments of the invention connected to an exhaust system of the motor vehicle.

According to FIG. 1 and FIG. 2, furthermore, an absorption material 25 is arranged in compact form within the tubular line part 10. The design and material of the absorption material 25, such as, for example, glass wool, determine, inter alia, the transmission properties of the device 1. Moreover, in a similar way to the tubular line part 10, an absorption material 26 is arranged in compact form within the tubular line part 16. The absorption materials 25, 26 may also have, in a way not illustrated, a firm grid structure and an air-permeable material surrounding the grid structure. Furthermore, the absorption materials 25, 26 may be produced from a fine fiber material by sintering. If appropriate, the absorption materials 25 and 26 may also be dispensed with.

The components 10, 11, 14, 15, 16, 17, 18, 25 and 26 thus constitute a vibrator chain with a defined transmission behavior. A change in this transmission behavior may be brought about by a change in the transmission behavior of the individual members, for example by a change in the damping behavior of the absorption materials 25 and 26, a change in length or cross-sectional area of the line parts 10 and 16, an arrangement of throttles or bodies in the line parts 10 and 16, a variation in the geometry or volume of the hollow body 12, but, in particular, by a variation in the mechanical properties of the vibrational element 14, for example its rigidity, damping or mass, specifically both in the embodiment of the vibrational element 14 with the diaphragm 17 and the plate 18 and when only the plate 18 is provided.

All these possibilities may, of course, also be combined in any desired way, and it would theoretically be possible to make these also capable of being influenced, for example by the electronically regulated stiffening of the diaphragm 17, by the compression of the absorption materials 25 and 26, etc. In a similar way to a switchable suction pipe, additional volumes could also be connected. A further possibility could also be to arrange displaceable pistons in the hollow body 12 and thus change the volume of the latter , for example as a function of the engine rotational speed. This could then also be carried out by the driver during travel.

In order to achieve a variation, for example an amplification or a frequency change in the acoustic signal generated, a plurality of diaphragms 14 may be provided within the space 15. A variation of this kind could also occur if the vibrational element 14 were designed in such a way that the fraction of the vibrational element 14 located in the space 11 were larger than the fraction in the space 15 or, alternatively to this, if the fraction of the vibrational element 14 located in the space 15 were larger than the fraction in the space 11.

FIG. 2 illustrates the device 1, FIG. 2 differing from the set-up shown in FIG. 1 in that the tubular line part 10 is not connected to the suction pipe 3, but in this case to the exhaust system 8. The set-up illustrated in FIG. 2 otherwise corresponds exactly to that in FIG. 1. A connection of the tubular line part 10 to each individual line or else to specific lines of the exhaust manifold 8*a* is, of course, also possible. The line part or the line parts 10 may, in principle, issue from the exhaust system 8 at any point, for example upstream or downstream of a catalytic converter, not illustrated. Furthermore, a line part 10 could also lead to the hollow body 12 both from the exhaust system 8 and from the intake pipe 3.

Figure 5:
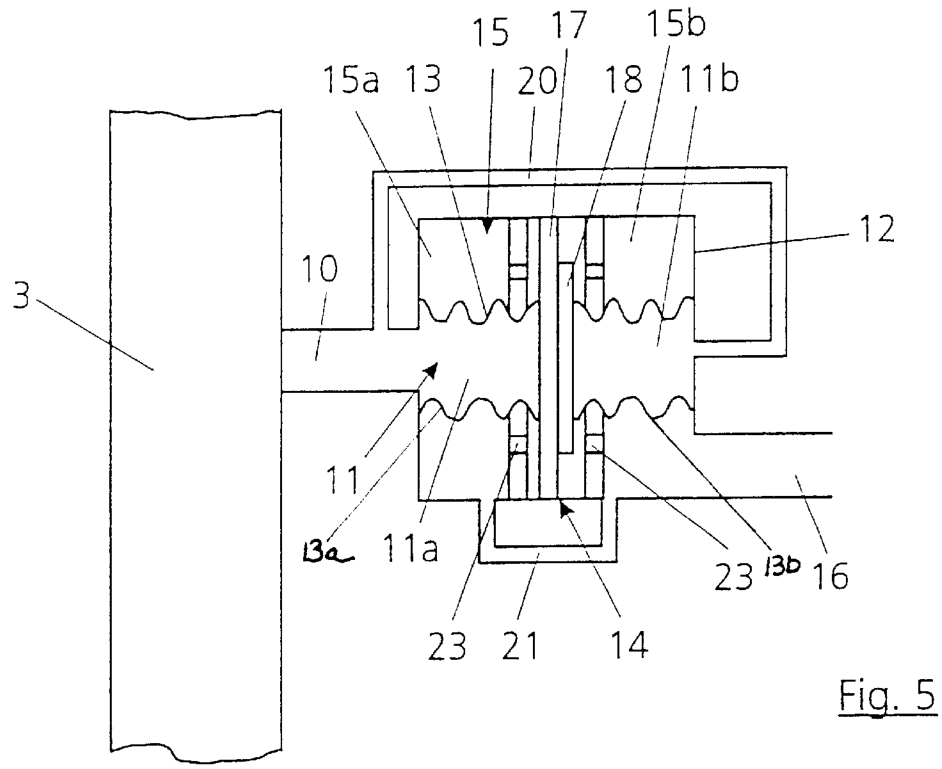
FIG. 5 is a schematic view which shows a second embodiment of a device according to the invention for use with the arrangements of FIG. 1 and FIG. 2.

FIG. 5 illustrates a further embodiment of the device 1. The wall 13 is formed, here, by two concertinas 13*a* and 13*b* which extend through the hollow body 12 in the axial direction and between which the vibrational element 14, again consisting of the diaphragm 17 and of the plate 18, is mounted. The concertinas 13*a* and 13*b* have high rigidity in the radial direction, but low rigidity in the axial direction, in order to allow the vibrational element 14 to execute vibrations in the axial direction. The concertinas 13*a* and 13*b* thus likewise constitute a rigid wall 13 in the radial direction.

Here, therefore, the space 11 connected to the line part 10 is arranged concentrically within the space 15 connected to the line 16 or the hollow body 12 is subdivided in the radial direction into the space 11 and the space 15 surrounding the latter.

In this case, it would also be possible to use the concertinas 13*a* and 13*b* specifically for sound transmission and to design them accordingly.

The vibrational element 14 extends through both spaces 11 and 15 and subdivides these again in each case into subspaces 11*a*, 11*b* and 15*a*, 15*b*. Thus, the dynamic sound-pressure vibrations occurring in the middle region of the vibrational element 14 are transmitted in the outer region of the latter to the space 15 and from there via the line 16, for example, to the interior 2.

Stops 23 are likewise provided within the space 15, in order, in the event of rapid pressure fluctuations, to limit the vibrating movement of vibrational element 14 which runs perpendicularly to the axis of rotation of the latter. The stops could, of course, also be provided within the space 11. As in the exemplary embodiment according to FIG. 3, the subspaces 11*a* and 11*b* are connected to one another by means of the duct 20. This also applies to the subspaces 15*a* and 15*b* which are connected to one another via the duct 21.

Figure 6:
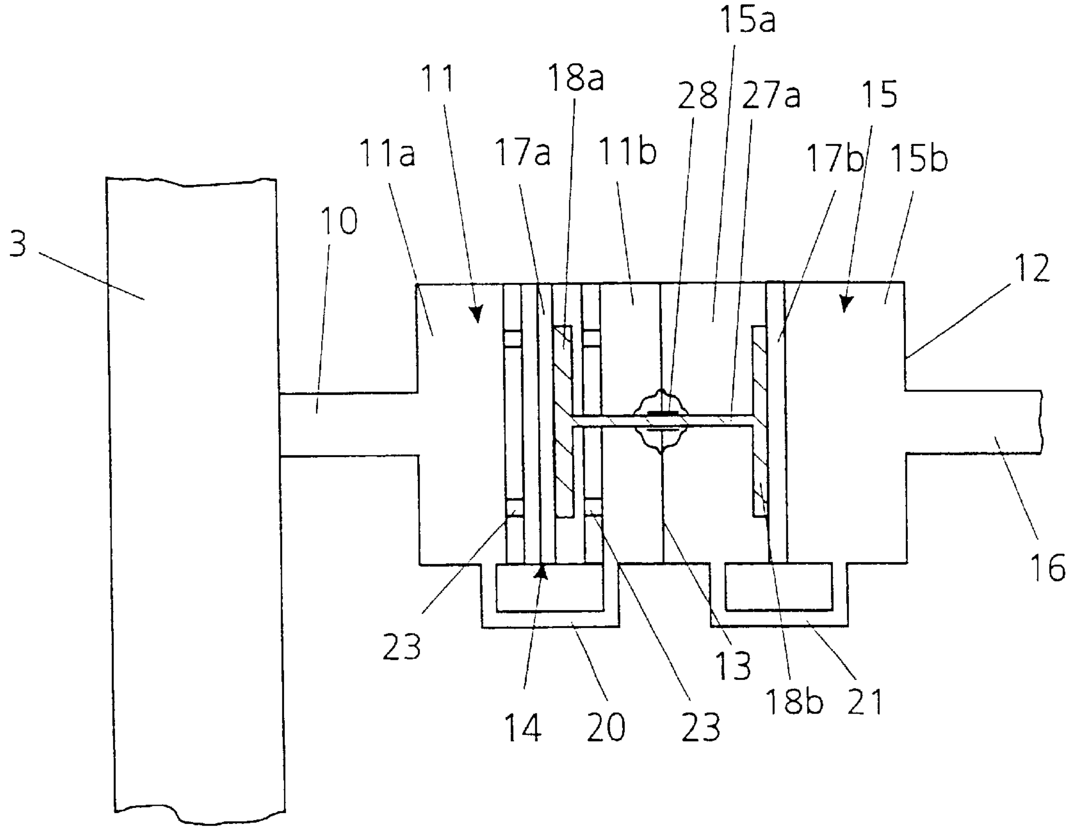
FIG. 6 is a schematic view which shows a third embodiment of a device according to the invention for use with the arrangements of FIG. 1 and FIG. 2.

A further embodiment of the device 1 is shown in FIG. 6, in which the wall 13 is again designed rigidly. However, the vibrational element 14 executing vibrating movements in the axial direction of the hollow body 12 has two plates 18*a* and 18*b* which are connected via a connecting element 27 and which are arranged in each case on diaphragms 17*a* and 17*b* secured to the hollow body 12. If appropriate, the diaphragms 17*a* and 17*b* could also be dispensed with, and the vibrational element would then be formed solely by the plates 18*a* and 18*b*. The connecting element 27 is formed by a rod 27*a* which is as light as possible and at the same time as rigid as possible and which, in the region in which it runs through the wall 13, is provided with a sealing device 28, for example in the form of a sliding seal or a diaphragm. The spaces 11 and 15, which in this case are located one behind the other, are again divided, by the diaphragms 17*a* and 17*b* and the plates 18*a* and 18*b* attached to these, in each case into subspaces 11*a*, 11*b* and 15*a*, 15*b* which, as in the preceding exemplary embodiments, are connected to one another by means of the ducts 20 and 21, so that no static forces act on the diaphragms 17*a* and 17*b* and these are not exposed to any static deformation which could impair their dynamic properties.

So that a variation in the acoustic signal can be achieved, it is possible to make the cross sections of the spaces 11 and 15 and therefore also the cross sections of the diaphragms 17*a* and 17*b* and/or the plates 18*a* and 18*b* of different size. The sound pressure and the sound flux within the line 16 can thereby be set.

In a way not illustrated, the sealing device 28 could be designed as a flexible diaphragm, be arranged in a bore receiving the rod 27*a* and be connected to the rod 27*a*. In this case, of course, the diameter of the bore for leading through the rod 27*a* is very much smaller than the diameter of the plates 18*a* and 18*b*.

The airborne sound vibrations are in this case absorbed by the plate 18*a* arranged in the space 11 and are transmitted via the rod 27*a* to the plate 18*b* arranged in the space 15. In the space 15, the vibrations of the second plate 18*b* are then radiated as sound waves and can leave the space 15 via the line 16. As a result of this, too, the transmission of the sound waves from the space 11 into the space 15 is therefore possible.

Figure 7:
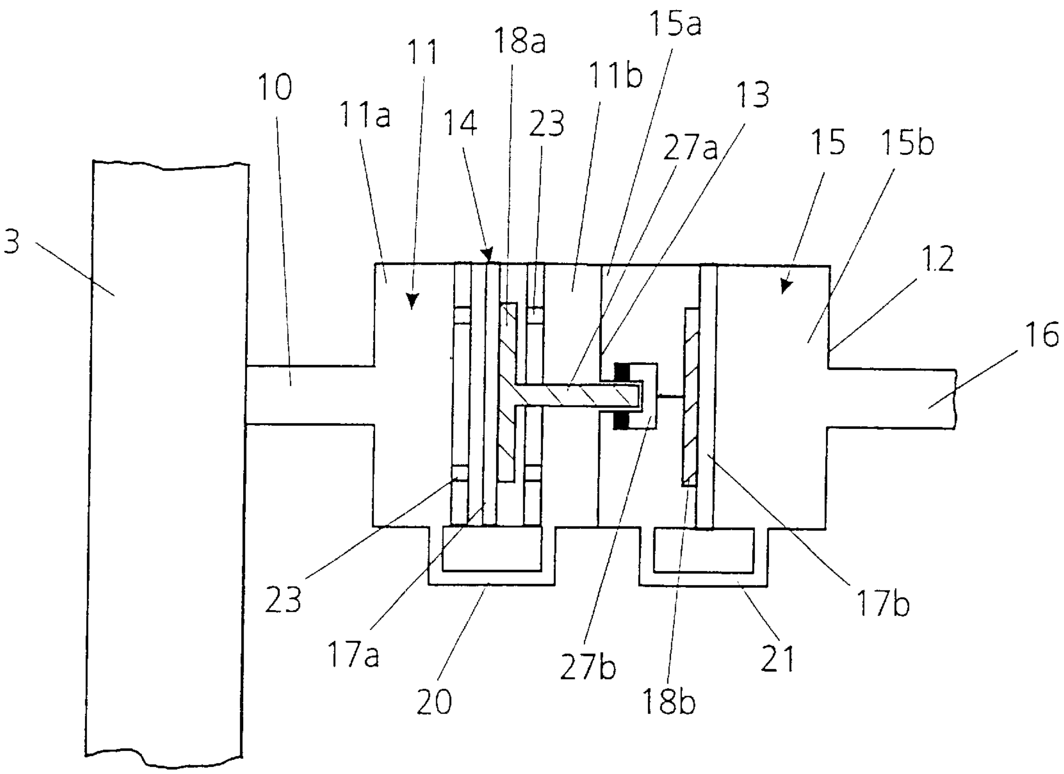
FIG. 7 is a schematic view which shows a fourth embodiment of a device according to the invention for use with the arrangements of FIG. 1 and FIG. 2.

The embodiment of the device 1 according to FIG. 7 is approximately identical to that from FIG. 6, the difference being that the connecting element 27 is formed by the rod 27*a*, which, however, runs only within the space 11, and by a magnetic coupling 27*b* co-operating with the rod 27*a*. The plate 18*b* arranged in the space 15 is connected to the magnetic coupling 27*b*, whereas, once again, the rod 27*a* is attached to the plate 18*a* accommodated in the space 11. The vibrations executed by the plate 18*a* in the space 11 are transmitted via the rod 27*a* and the magnetic coupling 27*b* to the plate 18*b* in the space 15 and thus allow the sound waves to be transmitted into the line 16.

In the exemplary embodiments according to FIG. 6 and FIG. 7, once again the stops 23 are provided for limiting the vibrating movement of the vibrational element 14, and the vibrational element 14 together with the plates 18*a* and 18*b* and, if appropriate, with the diaphragms 17*a* and 17*b* once again provide the subspaces 11*a*, 11*b* and 15*a*, 15*b*.

Figure 4:
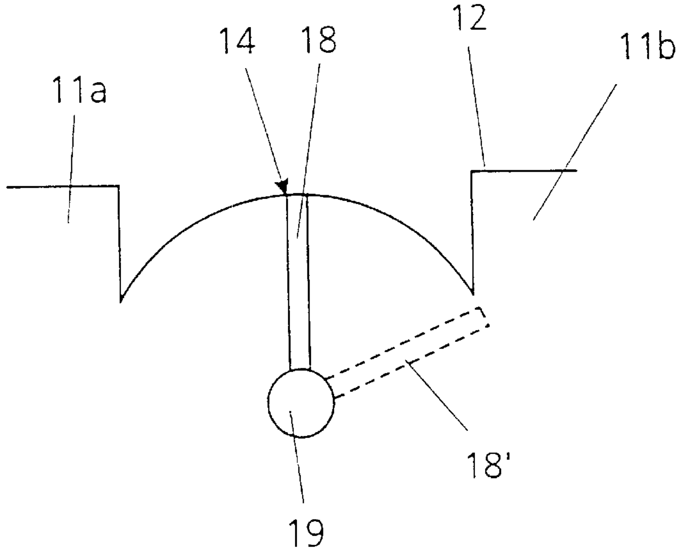
FIG. 4 schematically shows a view of a modified detail of the embodiment according to FIG. 3.

In all the embodiments according to FIGS. 5, 6 and 7, the diaphragm 17 may, if appropriate, be dispensed with and, instead, a plate 18 having an exact fit be used, as illustrated in FIG. 4.

In a way not illustrated, two line parts 10 independent of one another may also run from the intake pipe 2 to the space 11 and may emanate from different intake ducts 5 or specific lines of the exhaust manifold 8*a* or of the exhaust system 8. Two lines 16 may also run from the space 15 to the interior 2 or to another space which is connected to the motor vehicle, for example emanating from the subspaces 15*a* and 15*b*. It is thereby possible to generate the most diverse sound impressions.

Figure 8:
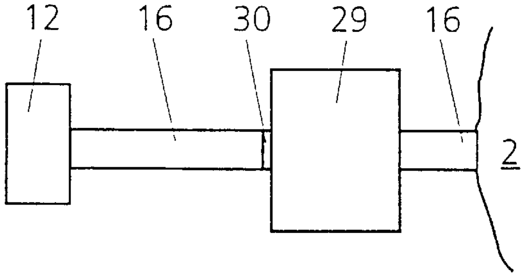
FIG. 8 is a schematic view which shows a connection of the device according to the invention to an interior of the motor vehicle.

According to FIG. 8, a further hollow body 29 located downstream of the above-described hollow body 12 is arranged in the line 16 to the interior 2. This results in additional amplification of the acoustic signal along with the possibility of varying or configuring the signal generated, for example by high-frequency components being filtered out. A further absorption material 30 is arranged at the entry into the hollow body 29. In a way not illustrated, a vibrational diaphragm radiating directly into the surroundings could also be arranged directly at the exit of the line 16, in order to achieve a further amplification of the signal or a specific propagation of the latter.

Figure 9:
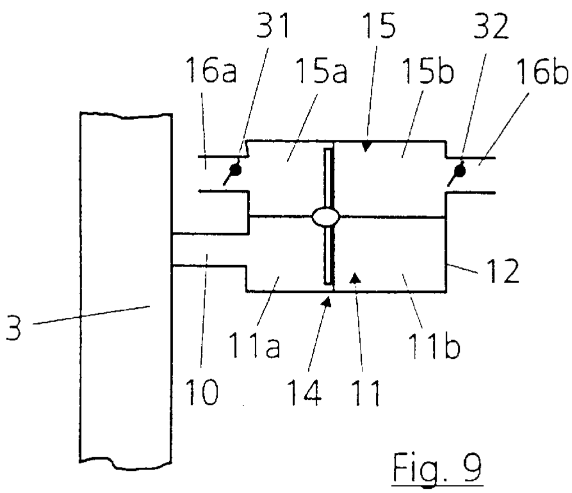
FIG. 9 is a schematic view which shows a fifth embodiment of a device according to the invention for use with the arrangements of FIG. 1 and FIG. 2.

In the embodiment of the device 1 according to FIG. 9, a line 16*a* and 16*b* is attached in each case to both subspaces 15*a* and 15*b*, in each case a closing device designed as a throttle valve 31 and 32 being located at the exit to the two lines 16*a* and 16*b*. With the aid of the two throttle valves 31 and 32, which may also be designed as shutters, a simple flap or the like, the generated or transmitted sound pressure can be reduced by a narrowing of the cross sections of the lines 11*a* and 16*b*, for example in the case of sound levels which are too high and which occur in specific operating states. The throttle valves 31 and 32 maybe activated electrically, hydraulically or pneumatically.

Figure 10:
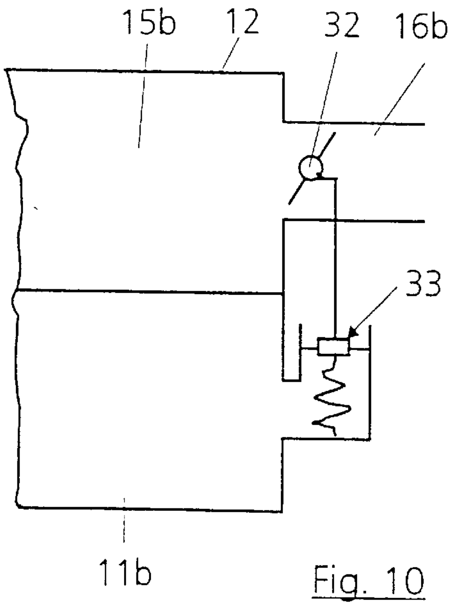
FIG. 10 is a schematic view which shows a sixth embodiment of a device according to the invention for use with the arrangements of FIG. 1 and FIG. 2.
Figure 11:
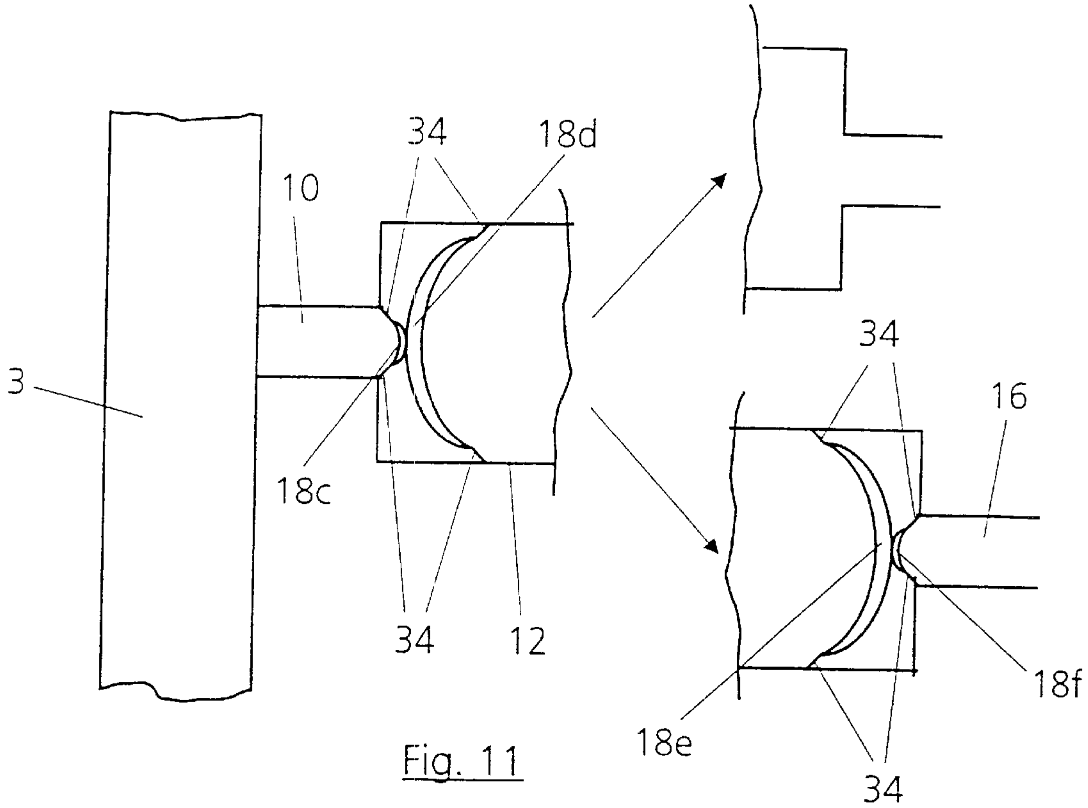
FIG. 11 is a schematic view which shows a seventh embodiment of a device according to the invention for use with the arrangements of FIG. 1 and FIG. 2.
Figure 12:
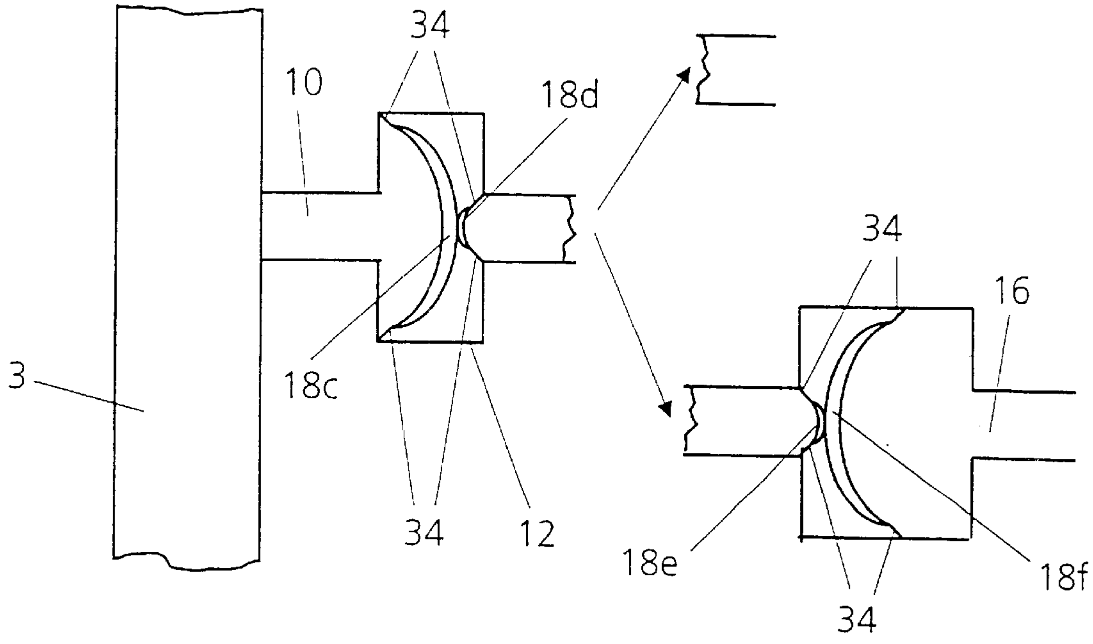
FIG. 12 is a schematic view which shows a eighth embodiment of a device according to the invention for use with the arrangements of FIG. 1 and FIG. 2.

FIG. 10 shows an activation of the throttle flap 32 by means of a control device 33, with the aid of which the throttle valve 32 is controlled by the static pressure in the intake system.

FIGS. 11–14 in each case illustrate devices 1, in which the vibrational element 14 in each case consists of two curved plates 18*c* and 18*d* connected to one another. In this instance, a kind of step-up for the transmitted sound waves can be achieved by means of the ratio of the cross sections of the, two plates 18*c* and 18*d*.

The arrows used here indicate that there are various possibilities for connecting or continuing the region in which the plates 18*c* and 18*d* are accommodated. Thus, for example, according to FIG. 11, two further bent or curved plates 18*e* and 18*f*, which make it possible to exert further influence on the acoustic signal, are provided at the exit of the hollow body 12 into the line 16.

All the plates 18*c*, 18*d*, 18*e* and 18*f* consist, in this case, of a very light and extremely rigid material, in order to ensure a good response to the sound waves. All the plates 18*c*, 18*d*, 18*e* and 18*f* are connected to the walls of the hollow body 12 via diaphragms 34 which ensure leak-tightness and resilience.

Figure 13:
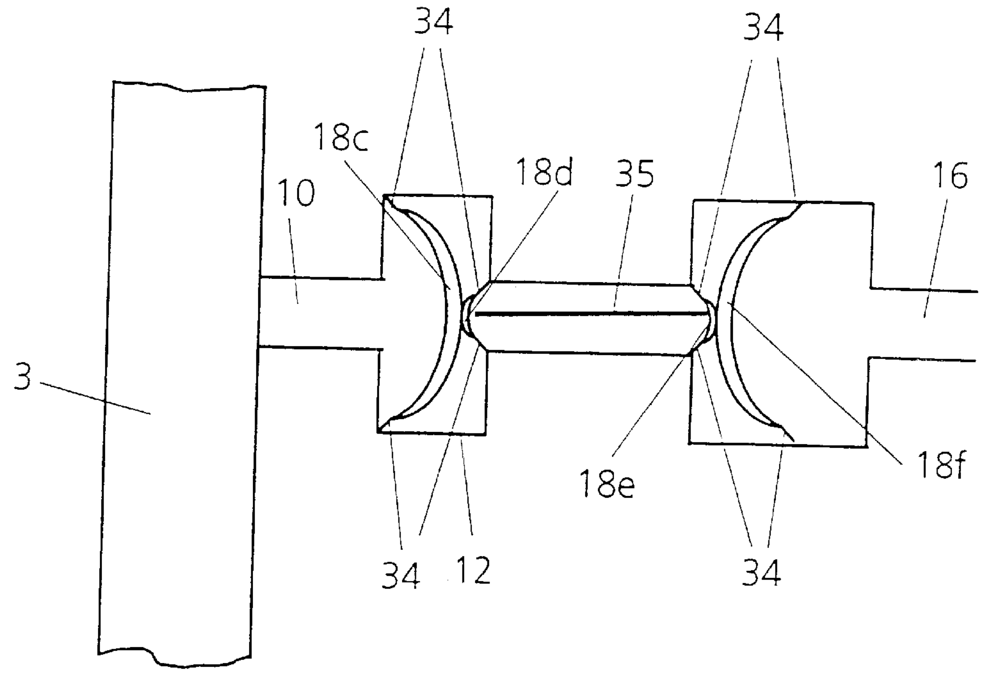
FIG. 13 is a schematic view which shows a ninth embodiment of a device according to the invention for use with the arrangements of FIG. 1 and FIG. 2.
Figure 14:
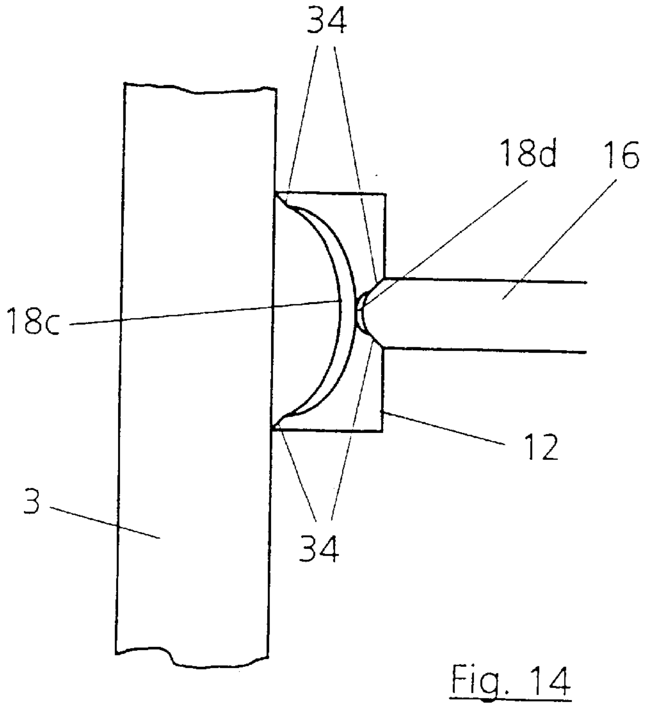
FIG. 14 is a schematic view which shows a tenth embodiment of a device according to the invention for use with the arrangements of FIG. 1 and FIG. 2.

In the embodiment according to FIG. 13, a coupling element 35 is provided between the pair of plates 18*c*, 18*d* and the pair of plates 18*e*, 18*f* and may be designed hydraulically, pneumatically, electrically, magnetically or purely mechanically.

Figure 15:
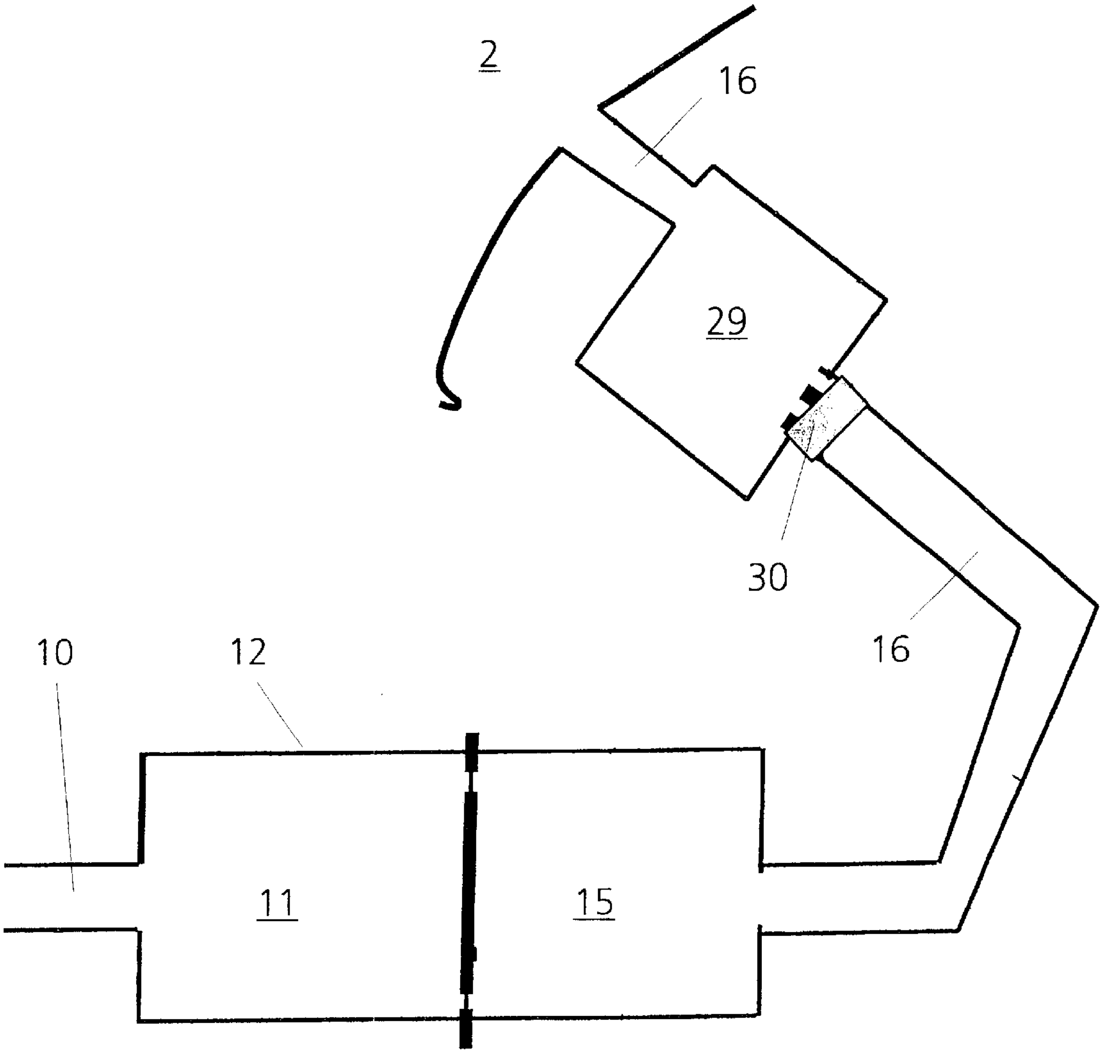
FIG. 15 is a schematic view of another embodiment which shows a connection similar to the FIG. 8 illustration.

FIG. 15 shows a design similar to FIG. 8 in which the line 16 extends from the space 15 to the interior space 2. Here, as well, the additional hollow space 29 is provided with the absorption material 30, which is arranged in front of the body. It is however also possible in this design to provide the vibration element 14 as a simple membrane and to forego the previously described designs with the acoustically inactive side 13 and the plates 18.

The acoustic driving-point impedance R of the absorption material 30 can be R=(0.8–1.3)×Po×C/Fo, wherein Po×C represents the wave impedance of the air and Of the cross-sectional surface of the line 16. This acoustic impedance R occurs when another absorption material 30, which is not depicted in the present case, is arranged at the exit of the line 16 to the interior 2, with this material reducing noise reflection and the standing waves in the line 16.

The flow resistance ΔP/Q of the absorption material 30 is ΔP/Q=(0.8–1.3)×Po×C/Fp, wherein Po×C represents the wave impedance of the air, Fp the cross-sectional surface of the line 16, Q the volume flow of the air and ΔP the loss in pressure. The above-mentioned formula is usually used when the line 16 is open towards the interior 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for noise configuration in a motor vehicle, comprising:

at least one hollow body which is divided into at least two spaces, one space being connected to a gas-carrying part of an internal combustion engine arranged in the motor vehicle, and the other space being coupled acoustically to at least one of an interior of the motor vehicle, an engine space of the motor vehicle, and a space surrounding the motor vehicle, an essentially acoustically inactive wall, wherein the hollow body is divided into the two spaces by the essentially acoustically inactive wall; and a vibrational element which extends into each of the two spaces.

2. Device according to claim 1, wherein the vibrational element divides the two spaces in each case into subspaces, at least the subspaces of the space connected to the gas-carrying part being connected to one another to allow pressure compensation.

3. Device according to claim 2, wherein the connection of the subspaces of the space connected to the gas-carrying part is formed by at least one bore in the vibrational element.

4. Device according to claim 2, wherein the connection of the subspaces of the space connected to the gas-carrying part is formed by at least one duct connecting the two subspaces.

5. Device according to claim 1, wherein the vibrational element has an elastic diaphragm connected to the hollow body and at least one plate attached to the diaphragm.

6. Device according to claim 2, wherein the vibrational element has an elastic diaphragm connected to the hollow body and at least one plate attached to the diaphragm.

7. Device according to claim 3, wherein the vibrational element has an elastic diaphragm connected to the hollow body and at least one plate attached to the diaphragm.

8. Device according to claim 4, wherein the vibrational element has an elastic diaphragm connected to the hollow body and at least one plate attached to the diaphragm.

9. Device according to claim 1, wherein the vibrational element is designed as a plate.

10. Device according to claim 2, wherein the vibrational element is designed as a plate.

11. Device according to claim 3, wherein the vibrational element is designed as a plate.

12. Device according to claim 4, wherein the vibrational element is designed as a plate.

13. Device according to claim 1, wherein the vibrational element is mounted rotatably about a center of rotation.

14. Device according to claim 5, wherein the vibrational element is mounted rotatably about a center of rotation.

15. Device according to claim 9, wherein the vibrational element is mounted rotatably about a center of rotation.

16. Device according to claim 13, wherein the center of rotation is located on the essentially acoustically inactive wall.

17. Device according to claim 1, wherein the vibrational element has two plates which are connected to one another via at least one connecting element and one of which plates is arranged in each case in each of the spaces.

18. Device according to claim 2, wherein the vibrational element has two plates which are connected to one another via at least one connecting element and one of which plates is arranged in each case in each of the spaces.

19. Device according to claim 17, wherein the two plates have different cross sections.

20. Device according to claim 17, wherein the connecting element is designed as at least one rod connecting the plates to one another.

21. Device according to claim 19, wherein the connecting element is designed as at least one rod connecting the plates to one another.

22. Device according to claim 20, wherein the rod is provided with a sealing device in a region merging from one space into the other space.

23. Device according to claim 22, wherein the sealing device is designed as a flexible diaphragm which is arranged in a bore receiving the rod and which is connected to the rod, the diameter of the bore being very much smaller than the diameter of the plates.

24. Device according to claim 17, wherein the connecting element has a magnetic coupling.

25. Device according to claim 19, wherein the connecting element has a magnetic coupling.

26. Device according to claim 20, wherein the connecting element has a magnetic coupling.

27. Device according to claim 22, wherein the connecting element has a magnetic coupling.

28. Device according to claim 23, wherein the connecting element has a magnetic coupling.

29. Device according to claim 5, wherein at least one of the at least one plates is designed in a sandwich form of construction and is provided with a coating.

30. Device according to claim 17, wherein each of the plates is designed in a sandwich form of construction and is provided with a coating.

31. Device according to claim 30, wherein the connecting element is designed as at least one rod connecting the plates to one another.

32. Device according to claim 1, wherein the gas-carrying part is an intake pipe of the internal combustion engine.

33. Device according to claim 1, wherein the gas-carrying part is an exhaust system of the internal combustion engine.

34. Device according to claim 1, wherein one of the two spaces of the hollow body is connected via a tubular line part to the one of the gas-carrying part of the motor vehicle and the space surrounding the motor vehicle, and wherein the other space is coupled acoustically via at least one line to one of the interior, the engine space and the space surrounding the motor vehicle.

35. Device according to claim 5, wherein the diaphragm consists of a gas-tight and liquid-tight material.

36. Device according to claim 1, wherein a plurality of vibrational elements are within the hollow body.

37. Device according to claim 2, wherein the subspace is connected to an exterior of the subspace via a bore.

38. Device according to claim 1, wherein a fraction of the vibrational element located in one of the spaces is larger than the fraction in the other space.

39. Device according to claim 38, wherein the fraction of the vibrational element located in the space coupled acoustically is larger than the fraction in the space connected to the gas carrying part.

40. Device according to claim 38, wherein the fraction of the vibrational element located in the space coupled acoustically is smaller than the fraction in the space connected to the gas carrying part.

41. Device according to claim 1, wherein at least one stop is arranged within the hollow body in order to limit the movement of the vibrational element.

42. Device according to claim 1, wherein a further hollow body is arranged between the hollow body and the at least one of the interior, the engine space, and the space surrounding the motor vehicle.

43. Device according to claim 34, wherein at least one line leads in each case from the two subspaces to the at least one of the interior, the engine space and the space surrounding the motor vehicle.

44. Device according to claim 1, wherein at least one closing device is arranged downstream of the hollow body.

45. Device according to claim 1, wherein at least one closing device is arranged upstream of the hollow body.

46. Device according to claim 44, wherein the at least one closing device can be activated electrically, hydraulically or pneumatically.

47. Device according to claim 45, wherein the at least one closing device can be activated electrically, hydraulically or pneumatically.

48. Device according to claim 34, wherein an additional hollow body is arranged in the at least one line to one of the interior, the engine space and the space surrounding the motor vehicle, and wherein an absorbtion material is arranged at an entrance to the additional hollow body.

49. Noise control system for a motor vehicle comprising:

a hollow body including first and second hollow body spaces, an essentially acoustically inactive wall in said hollow body separating the first and second hollow body spaces from one another, and vibration transmitting means disposed in the hollow body and extending into both of the first and second hollow body spaces and operable to transmit sound between the spaces.

50. Noise control system according to claim 49, wherein said first hollow body space includes an inlet opening for gaseous medium from one of an intake and an exhaust system of a vehicle internal combustion engine.

51. Noise control system according to claim 50, wherein said second hollow body space is acoustically coupled in use to at least one of a vehicle passenger space, a vehicle engine space, and a space surrounding a vehicle.

52. Noise control system according to claim 50, wherein said second hollow space is acoustically coupled in use to a vehicle passenger space whereby sound is transmitted to the vehicle passenger space, which sound is controlled as a function of gaseous medium pressure in said first hollow space.

53. Noise control system according to claim 49, wherein said vibration transmitting means includes means extending through the acoustically inactive wall into both the first and second hollow body spaces.

54. Noise control system according to claim 53, wherein said first hollow body space includes an inlet opening for gaseous medium from one of an intake and an exhaust system of a vehicle internal combustion engine.

55. Noise control system according to claim 54, wherein said second hollow space is acoustically coupled in use to a vehicle passenger space whereby sound is transmitted to the vehicle passenger space, which sound is controlled as a function of gaseous medium pressure in said first hollow space.

56. A method of controlling noise in a motor vehicle, comprising:

communicating gaseous medium from one of an intake and an exhaust system of a vehicle internal combustion to a first hollow body space of a hollow body, separating said first hollow body space from a second hollow body space in said hollow body by an essentially acoustically in active wall in said hollow body, and transmitting vibrations from the gaseous medium in said first hollow body space to said second hollow body space by way of a vibration transmitting means disposed in the hollow body and extending into both the first and second hollow body spaces.

57. A method according to claim 56, wherein said second hollow body space is acoustically coupled in use to at least one of a vehicle passenger space, a vehicle engine space, and a space surrounding a vehicle.

58. A method according to claim 56, wherein said second hollow space is acoustically coupled in use to a vehicle passenger space whereby sound is transmitted to the vehicle passenger space, which sound is controlled as a function of gaseous medium pressure in said first hollow space.

59. A method according to claim 58, wherein said vibration transmitting means includes means extending through the acoustically inactive wall into both the first and second hollow body spaces.

* * * * *